United States Patent

Baumstark et al.

[11] Patent Number: 5,905,114
[45] Date of Patent: May 18, 1999

[54] BINDERS FOR LOW-EMISSION COATING COMPOSITIONS

[75] Inventors: Roland Baumstark; Rolf Dersch, both of Neustadt, Germany

[73] Assignee: BASF Aktiengesellschaft, Ludwigshafen, Germany

[21] Appl. No.: 08/861,805

[22] Filed: May 22, 1997

[30] Foreign Application Priority Data

May 29, 1996 [DE] Germany .......................... 196 21 574

[51] Int. Cl.$^6$ ..................................................... C08F 2/32
[52] U.S. Cl. .................... 524/801; 524/539; 524/543; 524/550; 524/556; 524/559; 524/560; 524/755; 524/765; 524/802; 524/845
[58] Field of Search ..................... 524/539, 543, 524/550, 556, 559, 560, 755, 765, 801, 802, 845; 106/31.25

[56] References Cited

U.S. PATENT DOCUMENTS

| | | | |
|---|---|---|---|
| 3,876,596 | 4/1975 | Grubert et al. | 524/44 |
| 4,474,926 | 10/1984 | Burroway | 524/710 |
| 4,522,972 | 6/1985 | Mondt et al. | 524/548 |
| 5,474,638 | 12/1995 | Kohlhammer et al. | 156/308.2 |

FOREIGN PATENT DOCUMENTS

| | | |
|---|---|---|
| 71 070 | 2/1983 | European Pat. Off. . |
| 115 468 | 8/1984 | European Pat. Off. . |
| 622 434 | 11/1994 | European Pat. Off. . |
| WO 94/21699 | 9/1994 | WIPO . |

*Primary Examiner*—Samuel A. Acquah
*Attorney, Agent, or Firm*—Oblon, Spivak, McClelland, Maier & Neustadt, P.C.

[57] ABSTRACT

The present invention relates to low-odor binders which can be processed without solvent and are based on aqueous styrene-acrylate polymer dispersions, having a mean film-forming temperature of below 10° C.

The invention also relates to low-emission coating compositions, especially emulsion paints, which comprise these binders.

24 Claims, No Drawings

BINDERS FOR LOW-EMISSION COATING COMPOSITIONS

The present invention relates to low-odor binders which can be processed without solvent, based on polymer dispersions with a mean film-forming temperature below 10° C.

To reduce environmental pollution and from a workplace safety standpoint it is desirable for coating compositions, especially those used in enclosed areas, such as emulsion paints, polymer dispersion plasters or tile adhesives, not to give off nonaqueous, volatile organic or inorganic constituents to their surroundings. In principle, this can in part be achieved by using aqueous polymer dispersions as binders for these coating systems.

However, conventional binders based on aqueous polymer dispersions generally still include small amounts of organic solvent. These are necessary in order to reduce the mean film-forming temperature of the binders and so ensure that the coating compositions can be processed even at low temperatures. The mean film-forming temperature of the polymer binders can also be reduced by "internal plasticization", i.e. by lowering the glass transition temperature of the binder polymer (see Ullmann's Encyclopaedia of Industrial Chemistry, 5 Ed. Vol. A21, p. 169). If the film-forming temperature of the polymer binder is too low, however, there is the danger that the coating compositions will have a poor pigment binding capacity and will lack adequate mechanical strength, and, moreover, will soil easily (see H. Rinno, farbe+lack, 99 (1993) 697 et seq.).

For reasons of cost it is advantageous for the binder to have the capacity to bind large amounts of fillers. Interior emulsion paints, for example, have pigment volume concentrations p.v.c. (p.v.c.=pigment volume/(pigment volume+binder volume); cf. Ullmanns Enzyklopädie der Technischen Chemie, 4th Ed. Vol. 15, p. 667) in the range from 50 to 85%. If the p.v.c. tolerated by the binder is exceeded, the paint film no longer has adequate wet abrasion resistance. According to H. Warson ('Synthetic Resin Emulsions', E. Benn Ltd., London, 1972, p. 776 et seq.), polymers have a high pigment-binding power if they include from 1 to 4% by weight of copolymerized, carboxyl-containing monomers. In the case of high-grade binders, indeed, the content of these monomers is from 2.5 to 7% by weight. Alternatively, if the acid content is too high, there is the danger of the polymer becoming soluble in water, with a resulting decrease in the wet abrasion resistance of the coating compositions.

The literature includes a range of examples of polymer dispersions suited for use as solvent-free binders for low-emission coating compositions. For example, EP-B-327 006 and EP-B-327 376 describe polymer dispersions based on vinyl esters where the copolymerized monomers include, in small amounts, silanes. EP-A-612 771 describes similar binder polymers, based on acrylic esters, containing from 1 to 4% by weight of copolymerized carboxy monomers and at least one silane monomer. Even minimal inclusion of vinylsilane monomers, however, represents a considerable increase in the cost of producing the binders. Moreover, the change in the properties of the binder on storage, owing to hydrolysis of the silane groups, must be considered.

EP-A-652 269 describes a binder for low-emission coating compositions, comprising a latex with coarse particles in the size range from 100 to 500 nm and also a fine latex, with particle sizes in the range from 5 to 40 nm. The coarse latex contains not only the principle monomers selected from styrene, butadiene, vinylnitriles and acrylates but also from 0.1 to 5% by weight of crosslinking monomers, from 0 to 20% by weight, preferably from 1 to 10% by weight, of ethylenically unsaturated carboxylic acids, and from 0 to 40% of other monomers, all in copolymerized form. Example 1 describes a coarse latex composed of 75.5% by weight of n-butyl acrylate, 10% by weight of 2-ethylhexyl acrylate, 9% by weight of styrene, 0.5% by weight of ethyleneglycol dimethacrylate, 2.7% by weight of acrylic acid, 0.5% by weight of acrylamide and 0.5% by weight of sulfoethyl methacrylate. The use of binders comprising two separately prepared polymer dispersions is too cumbersome for inexpensive coating compositions. Furthermore, the emulsion paints described do not produce paint films with satisfactory abrasion values either when two polymer dispersions or when the coarsely particulate polymer dispersion alone are or is used as binder.

EP-A-585 156 describes a binder for aqueous emulsion paints which is based on an aqueous acrylate polymer dispersion. To improve the abrasion values of colored coatings, an epoxy resin dispersion is added to the binder in amounts of from 0.1 to 4% by weight. The acrylate dispersion used includes, in copolymerized form, from 0.1 to 5% by weight of crosslinking monomers, from 0.1 to 5% by weight of $\alpha,\beta$-unsaturated carboxylic acids and from 0.1 to 5% by weight of sulfonate monomers. Example 1 describes an acrylate polymer composed of 48.7 parts by weight of styrene, 48.6 parts by weight of n-butyl acrylate, 4.7 parts by weight of acrylic acid and 0.5 parts by weight of methallyl sulfonate. The colored coatings obtained using these polymers again lack satisfactory abrasion values. The use of epoxide components appears poorly suited to the desired applications when their toxicity is taken into account.

WO 94/21699 describes binders for solvent-free emulsion paints with improved washoff properties which are composed of from 60 to 100% by weight of acrylic or methacrylic esters, from 0 to 40% by weight of vinyl-aromatic monomers, from 0 to 5% of $\alpha,\beta$-unsaturated mono- or polycarboxylic acids and from 0 to 3% by weight of at least one $\alpha,\beta$-unsaturated amide. The examples describe polymer dispersions whose copolymerized monomers include at least 2.5 parts by weight of acrylic acid. The emulsion paints described in Examples 6 to 9, which comprise these polymers as binders, are likewise lacking in satisfactory abrasion values.

It has now been found, surprisingly, that polymer dispersions containing less than 1% by weight of acidic monomers and/or their salts, in copolymerized form, feature higher wet abrasion strength when formulated as emulsion paints than the prior art binders, with comparable colloidal stability. This advantage is also maintained over formulations whose binders comprise two or more polymer components.

The present invention therefore provides low-odor binders which can be processed without solvent, based on at least one aqueous polymer dispersion having a minimum film-forming temperature of below 10° C., the aqueous polymer dispersion being obtainable by free-radical aqueous emulsion polymerization of a monomer mixture containing a) from 45 to 70 parts by weight of at least one monomer whose homopolymer has a glass transition temperature $T_g < 20°$ C., b) from 30 to 55 parts by weight of at least one monomer whose homopolymer has a glass transition temperature $T_g > 50°$ C., c) from 0 to 1 part by weight of at least one monomer with acidic groups, and d) from 0 to 2 parts by weight of at least one further monomer selected from amides of $\alpha,\beta$-unsaturated $C_3$–$C_6$ carboxylic acids, their $C_2$–$C_6$-hydroxyalkyl esters and/or N-vinyllactams, with the proviso that the sum of the parts by weight of a) plus b) is 100 parts by weight.

The glass transition temperature $T_g$ is the limit value of this parameter toward which it moves, according to G. Kanig (Kolloid-Zeitschrift & Zeitschrift für Polymere, 190, p. 1, Equation 1) with increasing molecular weight; it is determined by the DSC method (Differential Scanning Calorimetry, 20 K/min, midpoint). The $T_g$ values for the homopolymers of most monomers are known and are listed, for example, in Ullmann's Encyclopedia of Industrial Chemistry, VCH Weinheim, 1992, 5th Ed., Vol. A21, p. 169; other sources for the glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

$C_1$–$C_n$-alkyl refers below to linear or branched alkyl of 1 to n carbons, examples being methyl, ethyl, propyl, n-butyl, sec-butyl, isobutyl, t-butyl, pentyl, n-hexyl, 2-ethylhexyl, n-decyl, dodecyl, lauryl and stearyl. $C_5$–$C_{10}$-cycloalkyl is preferably cyclopentyl or cyclohexyl, each unsubstituted or substituted by 1, 2 or 3 $C_1$–$C_4$-alkyls.

From 45 to 70 parts by weight, preferably from 50 to 65 parts by weight, of the composition of the polymers present in the binders is accounted for by monomers a). Suitable monomers a) are preferably vinyl ethers of $C_3$–$C_{10}$-alkanols, branched and nonbranched $C_3$–$C_{10}$-olefins, $C_1$–$C_{10}$-alkyl acrylates, $C_5$–$C_{10}$-alkyl methacrylates, $C_5$–$C_{10}$-cycloalkyl (meth)acrylates, $C_1$–$C_{10}$-dialkyl maleates and/or $C_1$–$C_{10}$-dialkyl fumarates. Particular preference is given to the use of monomers a) whose homopolymers have glass transition temperatures of below 0° C. Particularly preferred monomers a) are ethyl, n-propyl n-butyl, isobutyl, sec-butyl, n-hexyl and 2-ethylhexyl acrylate, n-hexyl and 2-ethylhexyl methacrylate, and di-n-butyl maleate and/or di-n-butyl fumarate.

Suitable monomers b) are vinyl-aromatic monomers and/or α,β-unsaturated nitriles of mono- or dicarboxylic acids. They are used in amounts of from 30 to 55 parts by weight, preferably from 35 to 50 parts by weight. The term vinyl-aromatic monomers refers in particular to derivatives of styrene or of α-methyl styrene, in which the phenyl rings are unsubstituted or substituted once, twice or three times by $C_1$–$C_4$-alkyl, chlorine and/or methoxy. Preferred monomers are those whose homopolymers have a glass transition temperature of more than 80° C. Particularly preferred monomers are styrene, α-methylstyrene, o- and p-vinyltoluene, acrylonitrile, methacrylonitrile, malonitrile, fumaronitrile and mixtures thereof.

As monomers c), the novel binder polymers may include, in copolymerized form, ethylenically unsaturated monomers which are able to form anionic groups, in amounts of up to 1 part by weight, preferably up to 0.5 part by weight and, in particular, up to 0.3 part by weight, based on the sum of components a) plus b). These groups are preferably carboxylate, phosphonate or sulfonate, especially carboxylate. Particularly preferred monomers c) are monoethylenically unsaturated alkyl- or arylsulfonic acids, such as vinylsulfonic, methallylsulfonic, vinylbenzenesulfonic, acrylamidoethanesulfonic and acrylamido-2-methylpropanesulfonic acids, 2-sulfoethyl (meth)acrylate, sulfopropyl (meth)acrylate, and α,β-unsaturated $C_3$–$C_6$-carboxylic acids, α,β-unsaturated $C_4$–$C_8$ dicarboxylic acids, or their anhydrides, such as acrylic, methacrylic, crotonic, fumaric, maleic and itaconic acids, maleic and itaconic anhydrides, and the alkali metal or ammonium salts of the monomers mentioned, especially their sodium salts.

The novel binder polymers may also include, in copolymerized form, monomers d) in amounts of up to 2 parts by weight, preferably in amounts of from 0.5 to 2 parts by weight, and, in particular, in amounts of from 0.5 to 1.5 parts by weight. Preferred monomers are the amides and the hydroxyalkyl esters of α,β-unsaturated $C_3$–$C_6$ carboxylic acids—with particular preference acrylamide, methacrylamide, 2-hydroxyethyl acrylate, 2-hydroxyethyl methacrylate, 2-hydroxypropyl (meth)acrylate or 1,4-butanediol monoacrylate. A further suitable monomers is N-vinylpyrrolidone.

In addition to the abovementioned monomers a), b), c) and d), the novel binder polymers may also include further monomers in order to give the respective coating compositions greater strength. Examples of these are siloxane-functional monomers such as the vinyltrialkoxysilanes, for example vinyltrimethoxysilane, alkylvinyldialkoxysilanes or (meth)acryloxyalkyltrialkoxysilanes, for example (meth)acryloxyethyltrimethoxysilane and (meth)acryloxypropyltrimethoxysilane. These monomers can be used in amounts of from 0.05 to 1 part by weight, preferably from 0.05 to 0.5 part by weight, based on 100 parts by weight of monomers a) plus b).

The aqueous polymer dispersions used as novel binders are prepared by free-radical emulsion polymerization of the abovementioned monomers a) to d) in the presence of from 0.1 to 0.5% by weight, preferably from 0.1 to 0.4% by weight and, in particular, from 0.1 to 0.3% by weight, based in each case on the amount of monomers a) and b), of at least one free-radical polymerization initiator.

Suitable such initiators are all those capable of triggering free-radical aqueous emulsion polymerization: they may be peroxides, hydroperoxides, for example alkali metal peroxodisulfates, or azo compounds. Use is also made of combined systems comprising at least one organic reducing agent and at least one peroxide and/or hydroperoxide, examples being tert-butyl hydroperoxide with the sodium salt of hydroxymethanesulfinic acid, hydrogen peroxide with ascorbic acid, or sodium peroxodisulfate with sodium disulfite. Preferred combination systems additionally include a small amount of a metal compound which is soluble in the polymerization medium and whose metallic component can exist in two or more valency states, for example ascorbic acid/iron(II) sulfate/hydrogen peroxide, where the ascorbic acid is frequently replaced by the sodium salt of hydroxymethanesulfinic acid, sodium sulfite, sodium hydrogen sulfite or sodium bisulfite, and the hydrogen peroxide by tert-butyl hydroperoxide or alkali metal peroxodisulfates and/or ammonium peroxodisulfate. In place of a water-soluble iron(II) salt it is common to use a combination of water-soluble iron salts and vanadium salts. Preferred initiators are the ammonium or alkali metal salts of peroxosulfates or peroxodisulfates, especially sodium or potassium peroxodisulfate.

The novel binder polymers are preferably prepared using not only the surface-active substances customary for an emulsion polymerization but also at least one nonionic emulsifier in amounts of preferably from 0.5 to 10% by weight, especially from 1 to 8% by weight, and, with particular preference, from 2 to 4% by weight, based in each case on the overall amount of monomers. Nonionic emulsifiers which can be used are araliphatic or aliphatic examples, such as ethoxylated mono-, di- and trialkylphenols (EO units: 3 to 50, $C_4$–$C_9$-alkyl), ethoxylates of long-chain $C_8$–$C_{36}$ alcohols (EO units: 3 to 50) and also polyethylene oxide/polypropylene oxide block copolymers. Preference is given to ethoxylates of long-chain $C_{10}$–$C_{22}$- alkanols (mean degree of ethoxylation from 10 to 50) and among these, particular preference to those with linear $C_{12}$–$C_{18}$-alkyl and a mean degree of ethoxylation of 10 to 50 as sole nonionic emulsifiers. Also preferred are ethoxylates of $C_{12}$–$C_{18}$-alkanols, especially oxo alcohols, having a mean degree of ethoxylation of 8 to 50.

Further customary emulsifiers are preferably anionic in nature, and include alkali metal and ammonium salts of $C_8$–$C_{12}$-alkyl sulfates, of sulfuric acid half-esters of ethoxylated $C_{12}$–$C_{18}$-alkanols (EO units: 2 to 50) and of ethoxylated alkylphenols (EO units: 3 to 50, $C_4$–$C_9$-alkyl), of $C_{12}$–$C_{18}$-alkylsulfonic acids and of alkylarylsulfonic acids ($C_9$–$C_{18}$-alkyl). Further suitable emulsifiers are given in Houben-Weyl, Methoden der organischen Chemie, Volume XIV/1, Makromolekulare Stoffe [Macromolecular substances], Georg-Thieme Verlag, Stuttgart, 1961, pages 192–208.

Preferred anionic surfactants are compounds of the formula I,

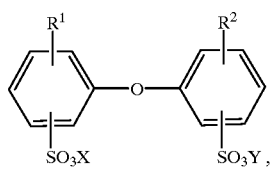

(I)

where $R^1$ and $R^2$ are hydrogen or $C_4$–$C_{24}$-alkyl but are not both hydrogen, and X and Y can be alkali metal and/or ammonium ions. In formula I, $R^1$ and $R^2$ are preferably linear or branched alkyls of 6 to 18 carbons or hydrogen, and especially of 6, 12 and 16 carbons, but are not both hydrogen. X and Y are preferably sodium, potassium or ammonium, the former being particularly preferred. Particularly advantageous compounds I are those in which X and Y are sodium, $R^1$ is branched $C_{12}$-alkyl and $R^2$ is hydrogen or the same as $R^1$. Use is frequently made of technical-grade mixtures in which the proportion of the monoalkylated product is from 50 to 90% by weight, an example being Dowfax® 2A1 (trade mark of Dow Chemical Company). The compounds I are generally known, for example from U.S. Pat. No. 4,269,749, and are obtainable commercially.

It is possible, moreover, to make use of appropriate collective colloids such as, for example, polyvinyl alcohols, cellulose derivatives or vinylpyrrolidone copolymers. A detailed description of further suitable protective colloids is given in Houben-Weyl, loc. cit., pp. 411–420. The overall amount of surfactants accounts usually for up to 30% by weight, preferably from 0.5 to 10% by weight and, with particular preference, from 2 to 6% by weight, based on the monomers to be polymerized.

The molecular weight of the polymers can be adjusted by adding small amounts—generally up to 2% by weight based on the monomers to be polymerized—of one or more molecular weight regulators, such as organic thio compounds or allyl alcohols. Preference, however, is given to polymers prepared in the absence of such compounds.

The emulsion polymerization can be carried out either continuously or by the batch procedure, preferably by a semicontinuous technique. The monomers can be added to the polymerization batch continuously, including by a stepwise or gradient procedure. Preference is given to a feed technique with short feed times; in other words, the monomers are metered, preferably in aqueous emulsion form, into the reaction batch over the course of from 1 to 4 hours, preferably from 1.5 to 3 hours. The nonionic emulsifier is preferably introduced as initial charge in amounts of up to 20% by weight, based on the overall amount of nonionic emulsifier, whereas the anionic emulsifier is preferably supplied to the reaction batch together with the monomers.

Apart from the seed-free procedure, it is possible in order to adjust the polymer particle size to carry out the emulsion polymerization by the seed latex technique or in the presence of a seed latex prepared in situ. Techniques for doing this are known and can be found in the prior art (see EP-B 40 419 and 'Encyclopedia of Polymer Science and Technology', Vol. 5, John Wiley & Sons Inc., New York, 1966, p. 847).

Thus in the context of the feed technique the prior art recommends including a defined, finely divided seed polymer dispersion in the initial charge to the polymerization vessel and then polymerizing the monomers in the presence of the seed. Here, the seed polymer particles act as polymerization nuclei and decouple polymer particle formation from polymer particle growth. Further seed dispersion can be added during the emulsion polymerization, thereby achieving broad size distributions of the polymer particles, which are often desirable, especially in the case of polymer dispersions with a high solids content (cf. DE-A 42 13 965). Instead of adding a defined seed latex, it can also be produced in situ. For this purpose, for example, some of the monomers and the initiator are introduced initially together with emulsifier and are heated to reaction temperature, giving rise to a relatively finely divided latex. Subsequently, in the same polymerization vessel, actual polymerization is carried out in accordance with the feed technique (see also DE-A 42 13 965).

The way in which the initiator is supplied to the emulsion polymerization is not critical. It can either be included in its entirety in the initial charge to the polymerization vessel or else can be added, continuously or stepwise, in accordance with the rate of its consumption in the course of the emulsion polymerization. The procedure depends both on the chemical nature of the initiator and on the polymerization temperature, and can be chosen by the skilled worker as desired. Continuous or stepwise addition to the reaction batch is preferred.

Polymerization pressure and temperature are likewise of minor importance; the latter is generally from room temperature to 120° C., preferably from 50 to 95° C. and, with particular preference, from 70 to 90° C.

Following actual polymerization it is generally necessary substantially to free the novel aqueous polymer dispersions from odorous components, such as residual monomers and other volatile organic constituents. This can be done in a manner known per se, physically, by distillative removal (especially be means of steam distillation) or by stripping with an inert gas.

The residual monomer content can also be lowered chemically, by means of free-radical post-polymerization, especially under the action of redox initiator systems as described, for example, in DE-A 44 35 423, DE-A 44 19 518 and DE-A 44 35 422. Particularly suitable oxidizing agents for redox-initiated post-polymerization are hydrogen peroxide, tert-butyl hydroperoxide, cumene hydroperoxide and alkali metal peroxodisulfates. Suitable reducing agents are sodium disulfite, sodium hydrogen sulfite, sodium dithionite, sodium hydroxymethanesulfinate, formamidinesulfinic acid, acetone disulfite (also an adduct of sodium hydrogen sulfite with acetone), ascorbic acid, or reducing sugars or water-soluble mercaptans, such as mercaptoethanol. Post-polymerization with the redox initiator system is carried out at from 10 to 100° C., preferably from 20 to 90° C. Independently of one another, the redox partners can be added in whole, in portions or continuously over a period of from 10 minutes to 4 hours to the dispersion. To improve the post-polymerization effect of the redox initiator systems, soluble salts of metals of variable valence, such as iron, copper or vanadium salts, can also be added to the dispersion. In many cases, complexing agents are also added, which maintain the metal salts in solution under the reaction conditions.

It is preferred to carry out a concluding neutralization of the polymer dispersion with a low-odor base, preferably with alkali metal or alkaline earth metal hydroxides, alkaline earth metal oxides or nonvolatile amines. The latter include, in particular, ethoxylated diamines or polyamines as are obtainable commercially under the name, for example, of Jeffamine® (Texaco Chemical Co.). The polymer dispersion is preferably not neutralized with ammonia.

The novel binder polymers generally have minimum film-forming temperatures of below 10° C., preferably below 5° C. and, with particular preference, ≦3° C. The mean particle size of the polymer particles present in the binder dispersions, as determined by light scattering, is preferably in the range from 100 to 300 nm, particularly preferably in a range from 120 to 200 nm.

The light transmittance (see below) of the dispersions is generally within the range from 40 to 90%, preferably from 50 to 80% and, in particular, from 50 to 75%. Over wide ranges it correlates with the sizes of the dispersed particles; in other words, the larger the LT value (light transmittance of a 0.01% strength by weight sample), the smaller the diameter of the dispersed particles.

Because of the manner of the preparation, the novel binder polymers are almost completely free from solvents, monomers or other volatile constituents and are therefore low in odor and emission.

The novel binders are useful for preparing low-emission, solvent-free coating compositions, by which are meant, for example, polymer dispersion plasters, tile adhesives, paints and, in particular, low-emission emulsion paints. The novel binders are preferably suitable for low-emission emulsion paints with a high proportion of pigment (p.v.c., see above), with a p.v.c. of preferably more than 60% and in particular more than 70%, as are used for interior coatings.

Coating compositions of this kind are familiar in principle to the skilled worker. A detailed description of aqueous polymer emulsion paints can be found, for example, in Ullmanns Enzyklopädie der Technischen Chemie, 4th Ed., Vol. 15, p. 664 et seq. The novel low-emission emulsion paints or plasters generally contain, based on the nonvolatile components, from 40 to 94% by weight of fillers,
from 2 to 30% by weight of pigment,
from 0.1 to 10% by weight of auxiliaries, and
from 4 to 30% by weight, preferably up to 20% by weight, of the novel binders.

Examples of fillers suitable for emulsion paints are alumosilicates, silicates, alkaline earth metal carbonates, preferably calcium carbonate in the form of calcite or chalk, dolomite, and aluminum silicates or magnesium silicates such as talc. An example of a typical pigment is titanium dioxide, preferably in the rutile form. Tinting paints may also, however, include colored pigments, for example iron oxides. The customary auxiliaries include wetting agents, such as sodium or potassium polyphosphates, polyacrylic acids, their alkali metal salts, polyvinyl alcohols, etc. Furthermore, these emulsion paints usually include viscosity modifiers such as cellulose ethers, for example hydroxyethylcellulose. Moreover, the emulsion paints may have added to them dispersants, antifoams, preservatives or hydrophobicizers and also dyes, fibers or other ingredients.

The novel, solvent-free low-emission coating compositions score over their conventional counterparts by high abrasion resistance (in accordance with DIN 53778) even at high pigment volume concentrations, for example at a p.v.c. of 75%.

The pigment binding capacity of the novel binder dispersions, which even without the use of special active monomers or other additives matches or even exceeds the quality level of prior art aqueous binder dispersions which contain these special active monomers or additives, can be increased if desired by incorporating the additives and/or active monomers recommended by the prior art. Mention may be made here, for example, of modifying the binder polymers with silane groups. Such modification can be carried out by, for example, copolymerizing silanes containing olefinic double bonds, such as vinylsilanes or (meth) acryloxyalkylsilanes (see above and EP-A 327 006, EP-A 327 376 or EP-A 612 771). Furthermore, silane groups can be introduced into the binder polymer by polymerization in accordance with EP-A 640 629 in the presence of epoxysilanes, for example glycidyloxypropyltrimethoxysilane, or in accordance with EP-A 327 376 by polymerization in the presence of mercaptoalkylsilanes, for example mercaptopropyltrimethoxysilane.

The examples given below are intended to illustrate the invention but without restricting it.

EXAMPLES

Analysis

The particle size (z mean) of the polymer particles was determined by dynamic light scattering on a 0.01% by weight dispersion at 23° C. using an Autosizer IIc from Malvern Instruments, England. The value stated is the mean diameter of the cumulative evaluation (cumulant z-average) of the measured autocorrelation function.

The light transmittance (LT) was determined on a 0.01% by weight dispersion using white light in a customary commercial photometer at a path length of 25 mm. Measurement is carried out relative to water, which is allocated an LT of 100%.

The minimum film-forming temperature was determined in accordance with Ullmanns Enzyklopädie der technischen Chemie, 4th Ed., Vol. 19, Verlag Chemie, Weinheim (1980), p. 17. The apparatus used was a film-forming bench (metal plate to which a temperature gradient is applied). The film formed had a wet thickness of 1 mm. The stated minimum film-forming temperature is that temperature at which the film begins to show cracks.

1) General procedure for preparing the binder polymers

Examples 1 to 33

A polymerization vessel with stirrer and reflux condenser was charged with 1.5 g of nonionic emulsifier in the form of 7.5 g of a 20% strength by weight aqueous solution; see Table 1, 40 g of feed stream I and 200 g of denionized water and this mixture was heated with stirring to 85° C. Then 6 g of feed stream II were added and the temperature was maintained. After 15 minutes, the remainder of feed stream I was metered continuously into the polymerization batch over the course of 120 min (or 180 min) and the remainder of feed stream II over the course of 135 min (or 210 min, if the duration of metering for I was 180 min), beginning the additions at the same time and maintaining the same temperature. After the end of the addition of feed stream II, the reaction was allowed to continue at 85° C. for 2 hours. The reaction batch was then cooled to 70° C., 0.71 g of a 70% strength by weight aqueous t-butyl hydroperoxide solution was added, the temperature was maintained, and 5 g of a 10% strength aqueous sodium hydroxymethanesulfinate solution were metered in over the course of 30 minutes. Subsequently, the reaction batch was cooled to room temperature, a pH of 7.5 was established with 10% strength aqueous sodium hydroxide, and the mixture was filtered through a metal filter with a mesh size of 250 μm. A compilation of the process parameters and the characterization of the resulting polymers in terms of solids content, light transmittance and particle size are given in Table 1.

Feed stream I 4 g of disodium p-dodecyldiphenyl ether disulfonate in the form of 20 g of a 20% strength by weight aqueous solution 12.5 g of nonionic emulsifier 1 in the form of 62.5 g of a 20% strength by weight aqueous solution; see Table 1

4.1 g of sodium lauryl sulfate in the form of 27 g of 15% strength by weight aqueous solution x g of monomer C; see Table 1 y g of monomer D in the form of twice the amount of a 50% strength by weight aqueous solution; see Table 1

200 g of styrene (monomer B)

300 g of n-butyl acrylate (monomer A)

160+x g of water

Feed stream II 1.5 g of sodium peroxodisulfate 60 g of water

TABLE 1

| Ex. | Monomer C [g] | Monomer D [g] | | Nonionic emulsifier [g] | | FSI [min] | SC [%] | MFT [°C.] | LT [%] | PS [nm] |
|---|---|---|---|---|---|---|---|---|---|---|
| 1 | — | 0 | AM | 7.5 | (A) | 14 | 180 | 49.9 | n.d. | 63 | 182 |
| 2 | — | 0 | AM | 7.5 | (A) | 14 | 120 | 49.5 | 1 | 69 | 168 |
| 3 | AA | 0.5 | AM | 7.5 | (A) | 14 | 180 | 50.3 | n.d. | 64 | 190 |
| 4 | AA | 1.0 | AM | 7.5 | (A) | 14 | 180 | 50.0 | n.d. | 61 | 174 |
| 5 | AA | 1.5 | AM | 7.5 | (A) | 14 | 180 | 49.7 | n.d. | 69 | n.d. |
| 6 | AA | 2.5 | AM | 7.5 | (A) | 14 | 180 | 49.4 | n.d. | 63 | 191 |
| 7 | AA | 1.5 | AM | 7.5 | (A) | 14 | 180 | 49.1 | 3 | 63 | 181 |
| 8 | AA | 5.0 | AM | 7.5 | (A) | 14 | 180 | 49.4 | n.d. | 59 | 201 |
| V9 | AA | 7.5 | AM | 7.5 | (A) | 14 | 180 | 49.0 | n.d. | 68 | 180 |
| V10 | AA | 10 | AM | 7.5 | (A) | 14 | 180 | 49.3 | n.d. | 63 | 194 |
| V11 | AA | 12.5 | AM | 7.5 | (A) | 14 | 180 | 49.2 | n.d. | 60 | 213 |
| 12 | VS | 1.5 | AM | 7.5 | (A) | 14 | 120 | 49.5 | n.d. | 57 | n.d. |
| 13 | AA | 1.5 | HEA | 7.5 | (A) | 14 | 180 | 48.3 | n.d. | 64 | 170 |
| 14 | AA | 1.5 | HEMA | 7.5 | (A) | 14 | 180 | 48.3 | n.d. | 83 | 126 |
| 15 | AMPS | 2.5 | AM | 7.5 | (A) | 14 | 120 | 49.3 | n.d. | 55 | 225 |
| 16 | AA | 0 | AM | 7.5 | — | 0 | 120 | 49.3 | n.d. | 65 | n.d. |
| 17 | AA | 0 | AM | 7.5 | (A) | 10+ | 120 | 50.1 | 1 | 66 | 166 |
| 18 | AA | 0 | AM | 7.5 | (A) | 17.5+ | 120 | 49.2 | 0 | 68 | n.d. |
| 19 | AA | 2.5 | AM | 7.5 | (B) | 14 | 120 | 49.9 | n.d. | 67 | n.d. |
| 20 | AA | 2.5 | AM | 7.5 | (C) | 14 | 120 | 49.8 | n.d. | 67 | 162 |
| 21 | AA | 2.5 | AM | 7.5 | (D) | 14 | 120 | 49.7 | n.d. | 81 | 138 |
| 22 | AA | 2.5 | AM | 7.5 | (E) | 14 | 120 | 50.1 | n.d. | 74 | n.d. |
| 23 | AA | 2.5 | AM | 7.5 | (F) | 14 | 120 | 49.9 | n.d. | 75 | n.d. |
| 24 | AA | 2.5 | AM | 7.5 | (G) | 14 | 120 | 49.6 | n.d. | 78 | n.d. |
| 25 | AA | 2.5 | AM | 7.5 | Sapogenat ®T300 | 14 | 120 | 49.8 | n.d. | 74 | n.d. |
| 26 | AA | 2.5 | AM | 7.5 | (H) | 14 | 120 | 49.5 | n.d. | 61 | n.d. |
| 27 | AA | 2.5 | AM | 7.5 | (I) | 14 | 120 | 49.6 | n.d. | 72 | n.d. |
| 28 | MAA | 2.5 | AM | 7.5 | (A) | 14 | 120 | 49.1 | 2 | 65 | 172 |
| 29 | MAA | 5.0 | AM | 7.5 | (A) | 14 | 120 | 49.1 | 3 | 64 | 178 |
| V30 | MAA | 10 | AM | 7.5 | (A) | 14 | 180 | 49.5 | n.d. | 63 | 186 |
| 31 | AS | 0 | AM | 7.5 | (K) | 14 | 180 | 49.8 | 0 | 59 | 191 |
| 32 | AS | 0 | AM | 7.5 | (K) | 7.5+ | 180 | 49.7 | 1 | 61 | 174 |
| 33 | AS | 0 | AM | 7.5 | (K) | 5.0+ | 180 | 49.5 | 0 | 58 | 181 |

AA    Acrylic acid
MAA    Methacrylic acid
VS    Vinylsulfonic acid sodium salt
AMPS    Acrylamidopropanesulfonic acid sodium salt
AM    Acrylamide
HEA    2-Hydroxyethyl acrylate
HEMA    2-Hydroxyethyl methacrylate
SC    Solids content of dispersion in % by wt.
PS    Mean particle size in nm
LT    Light transmittance
MFT    Minimum film-forming temperature
V    Comparison experiment
n.d.    not determined
+    1.5 g in initial charge, remainder in feed stream I Emulsifier (B) Fatty alcohol ethoxylate ($C_{16}$–$C_{18}$-alkyl; mean degree of ethoxylation 11)

Emulsifier (A) Fatty alcohol ethoxylate ($C_{16}$–$C_{18}$-alkyl; mean degree of ethoxylation 18)

Emulsifier (C) Fatty alcohol ethoxylate ($C_{16}$–$C_{18}$-alkyl; mean degree of ethoxylation 25)

Emulsifier (I) Fatty alcohol ethoxylate ($C_{16}$–$C_{18}$-alkyl; mean degree of ethoxylation 40)

Emulsifier (D) Fatty alcohol ethoxylate ($C_{16}$–$C_{18}$-alkyl; mean degree of ethoxylation 50)

Emulsifier (E) Oxo alcohol ethoxylate ($C_{13}$–$C_{15}$-alkyl; mean degree of ethoxylation 30)

Emulsifier (K) Oxo alcohol ethoxylate (branched $C_{13}$ alkyl (isotridecyl); degree of ethoxylation 8)

Emulsifier (F) Octylphenol ethoxylate (mean degree of ethoxylation 25)

Emulsifier (G) Octylphenol ethoxylate (mean degree of ethoxylation 50)

Sapogenat®T 300 Tributylphenol ethoxylate (mean degree of ethoxylation 30); commercial product from Hoechst AG Emulsifier (H) 6800 PO/EO-block copolymer (EO content 80%)

Examples 34 to 36 (Variable Initiator Concentration)

Polymerization was carried out as in Examples 1 to 30 using 1.5 g of acrylic acid (monomer C) and 7.5 g of acrylamide (monomer D) with 14 g of emulsifier (A) and with a feed time of 120 min for feed stream I and 135 min for feed stream II. The amount of initiator, the solids content and the mean particle size of the polymer are summarized in Table 2.

Feed stream II
60 g of deionized water
Z g of sodium peroxodisulfate (Table 2)

TABLE 2

| Example | Z [g] | SC [%] | MFT [° C.] | LT [%] | PS [nm] |
|---|---|---|---|---|---|
| 34 | 1 | 50.2 | 3 | 70 | 177 |
| 35 | 1.5 | 50.3 | 2.5 | 69 | 177 |
| 36 | 2.5 | 50.5 | 2 | 68 | 177 |

Example 37

Polymerization was as described in Examples 1 to 30 using 1.5 g of acrylic acid as monomer c) and 7.5 g of acrylamide as monomer d) in the presence of 1.0 g of mercaptopropyltimethoxysilane (added via feed stream I), 1.5 g of sodium peroxodisulfate and 14 g of Lutensol®AT18. The solids content of the dispersion was 49.1% by weight and the mean particle size was 205 nm; the LT value was 55%.

Example 38

Polymerization was as in Examples 31 to 33 using 250 g of 2-ethylhexyl acrylate, 250 g of styrene, 7.5 g of acrylamide and 2.5 g of acrylic acid in the presence of 1.5 g of sodium peroxodisulfate and 14 g of Lutensol® AT 18. Particle size 170 nm, solids content 49.1% by weight, LT value 66%, MFT 4° C.

Example 39

Polymerization was carried out as in Example 35 but using 125 g of 2-ethylhexyl acrylate, 150 g of n-butyl acrylate, 175 g of styrene, 2.5 g of acrylic acid and 7.5 g of acrylamide. Solids content 50.0% by weight, particle size 196 nm, LT value 58%, MFT 4° C.

2. Novel emulsion paints

The novel emulsion paints were prepared by blending the components, indicated in Table 3 for formulations 1 to 3, in the sequence indicated therein using a dissolver. The varying solids content of the dispersions employed was taken into account in the amount for use (see Table 4).

TABLE 3

Paint formulations (in parts by weight or % by weight)

| Paint formulations | Formul. 1 | Formul. 2 | Formul. 3 |
|---|---|---|---|
| Water | 96 | 106 | 106 |
| Sodium hydroxide (20% strength aqueous solution) | 1 | 1 | 1 |
| Sodium polyacrylate (35% strength aqueous solution) | 3 | 3 | 3 |
| Sodium polyphosphate (25% strength aqueous solution) | 3 | 3 | 3 |
| Hydroxyethylcellulose (2% strength aqueous solution) | 180 | 180 | 180 |
| Preservative | 3 | 3 | 3 |
| Antifoam | 4 | 3 | 4 |
| $TiO_2$ (rutile, 0.3 μ) | 70 | 65 | 65 |
| Aluminum silicate (6 μ) | 5 | 5 | 5 |
| Calcite (5 μ) | 235 | 215 | 215 |
| Calcium carbonate (precipitated; 0.3 μ) | 55 | 55 | 55 |
| Chalk (2.4 μ) | 100 | 95 | 95 |
| Talc/dolomite (6 μ) | 65 | 65 | 65 |
| Dispersion | * | * | 130 |
| Water | * | — | 70 |
| p.v.c. | 79% | 81% | 75% |
| SC [% by wt.] | 59 | 62 | 57 |

* see Table 4
SC Solids content
p.v.c. Pigment volume concentration

Testing the abrasion resistance of the paint films obtained using the novel emulsion paints Testing was in accordance with DIN 53778, Sheet 2. A 60 mm wide doctor blade was used to draw a paint film with a dry thickness of 100 μm onto a Leneta film measuring about 430×80 mm. This film was stored at room temperature for 5, 7 and 28 days. Then, in an abrasion unit, an abrading brush was guided over the film with the constant dropwise application of a 0.25% strength by weight aqueous solution of sodium n-dodecylbenzenesulfonate (e.g. Marlon®A350 from Hüls). The number of double strokes until abrasion penetrated the film was taken as the measure of the abrasion resistance.

The results are summarized in Table 4.

TABLE 4

| Dispersion [g] (Ex.) | Formulation | Water [g] | Drying period | Abrasion cycles |
|---|---|---|---|---|
| 1 | 110.4 | 1 | 69.4 | 7d | 3360 |
| 2 | 111.3 | 1 | 68.7 | 7d | 3620 |
| 3 | 109.5 | 1 | 70.5 | 7d | 3600 |
| 4 | 110.2 | 1 | 69.8 | 7d | 2560 |
| 5 | 110.9 | 1 | 69.1 | 7d | 2790 |
| 6 | 112.5 | 1 | 67.5 | 7d | 2350 |
| 7 | 87.8 | 2 | — | 5d | 290 |
| 37 | 87.9 | 2 | — | 5d | 330 |
| 8 | 87.3 | 2 | — | 5d | 190 |

TABLE 4-continued

| Dispersion [g] (Ex.) | Formulation | Water [g] | Drying period | Abrasion cycles |
|---|---|---|---|---|
| V9 | 88.0 | 2 | — | 5d | 160 |
| V10 | 87.5 | 2 | — | 5d | 110 |
| V11 | 87.7 | 2 | — | 5d | 95 |
| 12 | 87.2 | 2 | — | 5d | 400 |
| 13 | 89.3 | 2 | — | 5d | 205 |
| 14 | 89.3 | 2 | — | 5d | 335 |
| 15 | 87.5 | 2 | — | 5d | 355 |
| 16 | 87.5 | 2 | — | 7d | 800 |
| 17 | 86.1 | 2 | — | 7d | 950 |
| 2 | 87.2 | 2 | — | 7d | 1060 |
| 18 | 87.7 | 2 | — | 7d | 970 |
| 19 | 86.5 | 2 | — | 5d | 255 |
| 20 | 86.6 | 2 | — | 5d | 285 |
| 21 | 86.8 | 2 | — | 5d | 330 |
| 22 | 86.1 | 2 | — | 5d | 260 |
| 23 | 89.5 | 2 | — | 5d | 140 |
| 24 | 87.0 | 2 | — | 5d | 110 |
| 25 | 86.6 | 2 | — | 5d | 180 |
| 26 | 87.2 | 2 | — | 5d | 180 |
| 27 | 87.2 | 2 | — | 5d | 295 |
| 28 | 87.2 | 2 | — | 7d | 570 |
| 29 | 87.2 | 2 | — | 7d | 400 |
| V30 | 87.2 | 2 | — | 5d | 125 |
| 34 | 109.8 | 1 | 70.2 | 7d | 2990 |
| 35 | 109.6 | 1 | 70.4 | 7d | 2800 |
| 36 | 109.1 | 1 | 70.9 | 7d | 2630 |
| 38 | 112.3 | 1 | 67.7 | 7d | 2970 |
| 39 | 110.2 | 1 | 69.8 | 7d | 2400 |

As is evident from Table 4, the paint films obtained using the novel binders have greater abrasion resistance than those based on binders with a high content of copolymerized acidic monomers.

3. Comparison experiments with commercially available polymer dispersions

Mowilith® DM 129 and Mowilith LDM 1880 are polymer dispersions based on ethylene/vinyl acetate and contain protective colloid. The solids content is 55% by weight and the mean film-forming temperature is below 1° C. Mowilith LDM 1880 contains about 0.2% by weight of silicon-containing monomers (methacryloxypropyltrimethoxysilane). The paint dispersions were prepared as described above in accordance with formulation No. 3. of the 55% by weight Mowilith dispersions, however, only 118 parts by weight (instead of 130 parts of the dispersion from Ex. 2) and, correspondingly, 82 parts by weight of water (instead of 70 parts) were used, based on 1000 parts of paint. The preparation of the paint films and the measurement of the abrasion resistance were carried out as described under 2. The results are summarized in Table 5.

TABLE 5

| Dispersion | Drying | Abrasion cycles |
|---|---|---|
| Mowilith ® DM 129 | 28 d | 2270 |
| Mowilith ® LDM 1880 | 28 d | 3020 |
| Example 2 | 28 d | >8000 |

We claim:
1. A binder based on at least one aqueous polymer dispersion having a minimum film-forming temperature of below 10° C., the aqueous polymer dispersion being obtained by free-radical aqueous emulsion polymerization of a monomer mixture containing
   a) from 45 to 70 parts by weight of at least one monomer whose homopolymer has a glass transition temperature $T_g < 20°$ C.,
   b) from 30 to 55 parts by weight of at least one monomer whose homopolymer has a glass transition temperature $T_g > 50°$ C.,
   c) from 0 to 1 part by weight of at least one monomer with acidic groups, and
   d) from 0 to 2 parts by weight of at least one further monomer selected from amides of $\alpha,\beta$-unsaturated $C_3$–$C_6$-carboxylic acids, their $C_2$–$C_6$-hydroxyalkyl esters and/or N-vinyllactams,
with the proviso that the sum of the parts by weight of a) plus b) is 100 parts by weight.

2. A binder as claimed in claim 1, wherein the monomer a) is selected from at least one $C_1$–$C_{10}$-alkyl acrylate, $C_5$–$C_{10}$-alkyl methacrylate, $C_5$–$C_{10}$-cycloalkyl (meth)acrylate, $C_1$–$C_{10}$-dialkyl maleate and/or $C_1$–$C_{10}$-dialkyl fumarate and the monomer b) is selected from at least one vinyl-aromatic monomer and/or an $\alpha,\beta$-unsaturated nitrile of a mono- or dicarboxylic acid.

3. A binder as claimed in claim 1, wherein the monomer c) is selected from $\alpha,\beta$-unsaturated $C_3$–$C_6$ carboxylic acids, $\alpha,\beta$-unsaturated $C_4$–$C_8$ dicarboxylic acids, or their anhydrides, monoethylenically unsaturated alkylsulfonic acids and/or arylsulfonic acids.

4. A binder as claimed in claim 1, wherein the binder polymer is composed of
   from 50 to 65 parts by weight of the monomers a),
   from 35 to 50 parts by weight of the monomers b),
   from 0 to 0.5 parts by weight of the monomers c) and
   from 0.5 to 2 parts by weight of the monomers d).

5. A binder as claimed in claim 4, wherein the binder polymer is composed of
   from 0 to 0.3 part by weight of the monomers c) and
   from 0.5 to 1.5 parts by weight of the monomers d).

6. A binder as claimed in 1, wherein the binder polymer is obtained by polymerization in the presence of at least one nonionic, aliphatic or araliphatic emulsifier.

7. A binder as claimed in claim 6, wherein the nonionic emulsifier is used in an amount in the range from 2 to 4% by weight, based on the overall weight of the monomers.

8. A binder as claimed in claim 6, wherein the nonionic emulsifier is an ethoxylated $C_8$–$C_{36}$ alcohol with a degree of ethoxylation in the range from 3 to 50.

9. A binder as claimed in claim 8, wherein the nonionic emulsifier is an ethoxylated $C_{10}$–$C_{22}$-alkanol with a degree of ethoxylation in the range from 10 to 50.

10. A binder as claimed in claim 8, wherein the nonionic emulsifier is an ethoxylated $C_{12}$–$C_{18}$-alkanol.

11. A binder as claimed claim 1, wherein the binder polymer is obtained by emulsion polymerization in the presence of from 0.1 to 0.5% by weight, based on the overall weight of the monomers, of at least one free-radical polymerization initiator.

12. A binder as claimed in claim 1, wherein the binder polymer is obtained by emulsion polymerization in the presence of peroxodisulfuric acid or an alkali metal or ammonium salt thereof as polymerization initiator.

13. A binder as claimed in claim 1, wherein the binder polymer is obtained by emulsion polymerization at from 70 to 90° C.

14. A binder as claimed in claim 1, wherein the binder polymer is obtained by emulsion polymerization of the monomers in the absence of a compound to regulate the degree of polymerization.

15. A binder as claimed in claim 1, in the form of particles wherein the particles of the binder polymer have mean diameters in the range from 100 to 300 nm.

16. A binder as claimed in claim 1, wherein the acidic groups of the copolymerized monomers c) are in neutralized form.

17. A binder as claimed in claim 16, wherein the polymer contains no ammonium salt groups.

18. A solvent-free, low-emission coating composition comprising at least one binder as claimed in claim 1.

19. A coating composition as claimed in claim 18 in the form of an interior emulsion paint with a pigment volume concentration (p.v.c.) of more than 60%.

20. A coating composition as claimed in claim 19, containing, based on the solids content, from 40 to 94% by weight of fillers, from 2 to 30% by weight of pigments, from 4 to 30% by weight of at least one polymer binder as claimed in any of claims 1 to 15 (calculated as solids), and from 0.1 to 10% by weight of customary auxiliaries.

21. The binder as claimed in claim 8, wherein the degree of ethoxylation is in the range of 8 to 50.

22. The binder as claimed in claim 8, wherein the degree of ethoxylation is in the range of 10 to 50.

23. The binder as claimed in claim 9, wherein the nonionic emulsifier has a linear carbon chain.

24. The binder as claimed in claim 10, wherein the nonionic emulsifier is an ethoxylated oxo alcohol, with a degree of ethoxylation in the range from 8 to 50.

* * * * *